United States Patent [19]
Fernandez et al.

[11] Patent Number: 5,383,717
[45] Date of Patent: Jan. 24, 1995

[54] BRAKE CONTROL OF HELPER LOCOMOTIVE

[75] Inventors: Emilio A. Fernandez, Fairfax County, Va.; Angel P. Bezos, Montgomery County, Md.

[73] Assignee: Pulse Electronics, Rockville, Md.

[21] Appl. No.: 119,975

[22] Filed: Sep. 10, 1993

[51] Int. Cl.6 ............................................. B61L 23/00
[52] U.S. Cl. .................................. 303/3; 246/167 R; 246/187 R; 303/8; 303/81; 303/86; 303/20
[58] Field of Search ........... 246/167 R, 187 R, 187 C, 246/190, 182 B, 182 R; 303/2, 3, 7-8, 18-20, 15, 13, 86, 81, DIG. 3

[56] References Cited

U.S. PATENT DOCUMENTS

| | | | |
|---|---|---|---|
| 3,583,771 | 6/1971 | Dressler, Jr. | 303/20 |
| 4,582,280 | 4/1986 | Nichols et al. | 246/182 R |
| 4,692,867 | 9/1987 | Poole | 303/3 X |
| 5,016,840 | 5/1991 | Bezos | 246/187 R |
| 5,180,213 | 1/1993 | Kingsbury | 303/86 |

*Primary Examiner*—Douglas C. Butler
*Attorney, Agent, or Firm*—Whitham, Curtis, Whitham & McGinn

[57] ABSTRACT

A brake control mechanism allows the engineman in a lead locomotive to control the brakes of a helper locomotive and does not require a manual connection of the brake pipe of the train to that of the helper locomotive. The End of Train (EOT) unit is used to effect this control. The EOT transmits brake pipe pressure data sensed at the end of the train. Both the lead locomotive and the helper locomotive are equipped with Head of Train (HOT) units which receive the transmitted data from the EOT unit. In the case of the HOT unit in the lead locomotive, this data is processed and displayed for the engineman in that locomotive, as is the normal operation in those units. However, in the case of the HOT unit in the helper locomotive, that unit is first of all set to receive the transmitted data from the EOT unit by dialing in the identification (ID) of the EOT unit using thumbwheels on the HOT unit provided for that purpose. Secondly, the data received by the HOT unit in the helper locomotive is used to control the pressure in the brake pipe of the helper locomotive so that the pressure in the helper locomotive brake pipe is made to "mirror" that sensed by the EOT unit, making the brakes of the helper train behave as if they were connected to and communicating with the brake pipe of the train to which the helper locomotive is connected.

9 Claims, 3 Drawing Sheets

BRAKE CONTROL OF HELPER LOCOMOTIVE

BACKGROUND OF THE INVENTION

1. Field of the Invention

The present invention generally relates to brake control systems for railroad locomotives and, more particularly, to a system for controlling the brakes of a helper locomotive from a lead locomotive in a train.

2. Description of the Prior Art

End of Train (EOT) signalling and monitoring equipment is now widely used, in place of cabooses, to meet operating and safety requirements of railroads. The information monitored by the EOT unit typically includes the air pressure of the brake line, battery condition, marker light operation, and train movement. This information is transmitted to the crew in the locomotive by a battery powered telemetry transmitter. In addition, the EOT unit typically includes a marker light mounted a specific height above the track and having a well defined beam pattern.

The EOT unit is mounted on the coupler of the last car of the train, and specific coupler mounts have been designed to allow a switching engine or a helper locomotive to couple to the last train without damaging the EOT unit. While not necessary for a switching engine in a rail yard, it is important for a helper locomotive to provide braking for the train. The braking provided by the helper locomotive should be controlled by the engineman in the lead locomotive while the helper locomotive is coupled to the train. To better understand the problem, consider a typical application of a helper locomotive for, say, a train transporting coal from mines in a mountainous region to a port for shipment to an ultimate destination. Such trains may be a mile long, and the consist may comprise three locomotives connected in tandem at the head of the train. The power provided by the three locomotives are more than adequate for the run from the mountains to the port, and quite often a helper locomotive is attached at the beginning of the run to clear the mountains. Once clear of the mountains, the helper locomotive is disconnected and returns to its point of origin.

The air brake system of the train comprises a brake pipe which extends the length of the train. The pressure is maintained in the brake pipe by the lead locomotive except when the engineman in the lead locomotive applies the brakes by releasing air pressure. The drop in air pressure propagates down the brake pipe causing brakes to be applied by the locomotives and all the cars in the train. With the advent of two-way EOT units, an emergency braking event can be initiated by the engineman by causing air pressure to be vented simultaneously at the front and back of the train.

Currently, the brake pipe hose of helper locomotives is connected to the train, as required by Federal Railroad Administration (FRA) Rule 232.15. This makes the brakes of the helper locomotive(s) respond like any other car in the train, thus giving control of the brakes to the engineer in the lead locomotive. Coupling and uncoupling of the brake hose of the helper locomotive to the train is accomplished manually. Both operations expose railroad personnel to risk of serious injury. Therefore, a safer alternative needs to be found to the manual coupling and uncoupling of the brake hose of the helper locomotive to the train.

One approach, exemplified in U.S. Pat. No. 5,180,213 to Kingsbury, is to provide a special valve that allows the brake pipe of the train to be coupled to the that of the helper locomotive without a loss of air in the brake pipe on initial coupling and upon decoupling. This valve allows an air tight coupling to the brake pipe hose at the end of the train before a pneumatic communication is established with the brake pipe of the helper locomotive. This coupling, however, still must be accomplished manually at the time the helper locomotive is coupled to the train. On the other hand, the design is such that when the helper locomotive decouples, the brake hose coupling has a break-away connection that prevents any loss of air pressure in the brake pipe of the train, allowing an on-the-fly decoupling of the helper locomotive.

While the Kingsbury approach accomplishes the stated goals of allowing the engineman in the lead locomotive to control the brakes of the helper locomotive as long as the helper locomotive is coupled to the train, it has several significant drawbacks. First, it requires that someone manually make the brake pipe connection causing delay but, more importantly, exposing the person making the connection to some considerable danger. And second, the valve mechanism remains on the train. This is less than ideal from the point of view of the logistics and reliability of the mechanism. Having the mechanism ride with the train exposes the train to an added potential problem due either to equipment malfunction or equipment theft and vandalism. Also, sometime, somewhere the valve mechanism must be removed from the train and shipped back to the helper location—a logistical nightmare for the railroads.

SUMMARY OF THE INVENTION

It is therefore an object of the present invention to provide a mechanism which allows the engineman in a lead locomotive to control the brakes of a helper locomotive without the necessity of a manual coupling or uncoupling of the brake hose of the helper locomotive to the brake pipe of the train.

According to the invention, the EOT unit is used to effect this control. More specifically, the normal operation of the EOT is to transmit brake pipe pressure data sensed at the end of the train. Both the lead locomotive and the helper locomotive are equipped with Head of Train (HOT) units which receive the transmitted data from the EOT unit. In the case of the HOT unit in the lead locomotive, this data is processed and displayed for the engineman in that locomotive, as is the normal operation in those units. However, the data received by the HOT unit in the helper locomotive is used to control the pressure in the brake pipe of the helper locomotive. In other words, the pressure in the helper locomotive brake pipe is made to "mirror" that sensed by the EOT unit, making the brakes of the helper train behave as if they were connected to and communicating with the brake pipe of the train to which the helper locomotive is connected. Thus, while brake pipe continuity requirements are met today by physically connecting the air hoses of the helper locomotive(s) and the train, the invention meets the requirements by means of an "electronic hose".

The HOT unit of the helper locomotive operates to hold pressure at the helper locomotive by controlling a pressure maintaining air manifold. This pressure maintaining air manifold holds a target pressure received from the EOT unit by opening or closing valves that connect the brake pipe to supply pressure (from the locomotive's approximately 140 psi source) or venting pressure to atmosphere. Since the brake pipe pressure target is always lower than 140 psi, the pressure maintaining manifold can maintain the target pressure by opening and closing the main air reservoir valve or the atmosphere valve as required to obtain the desired pressure.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
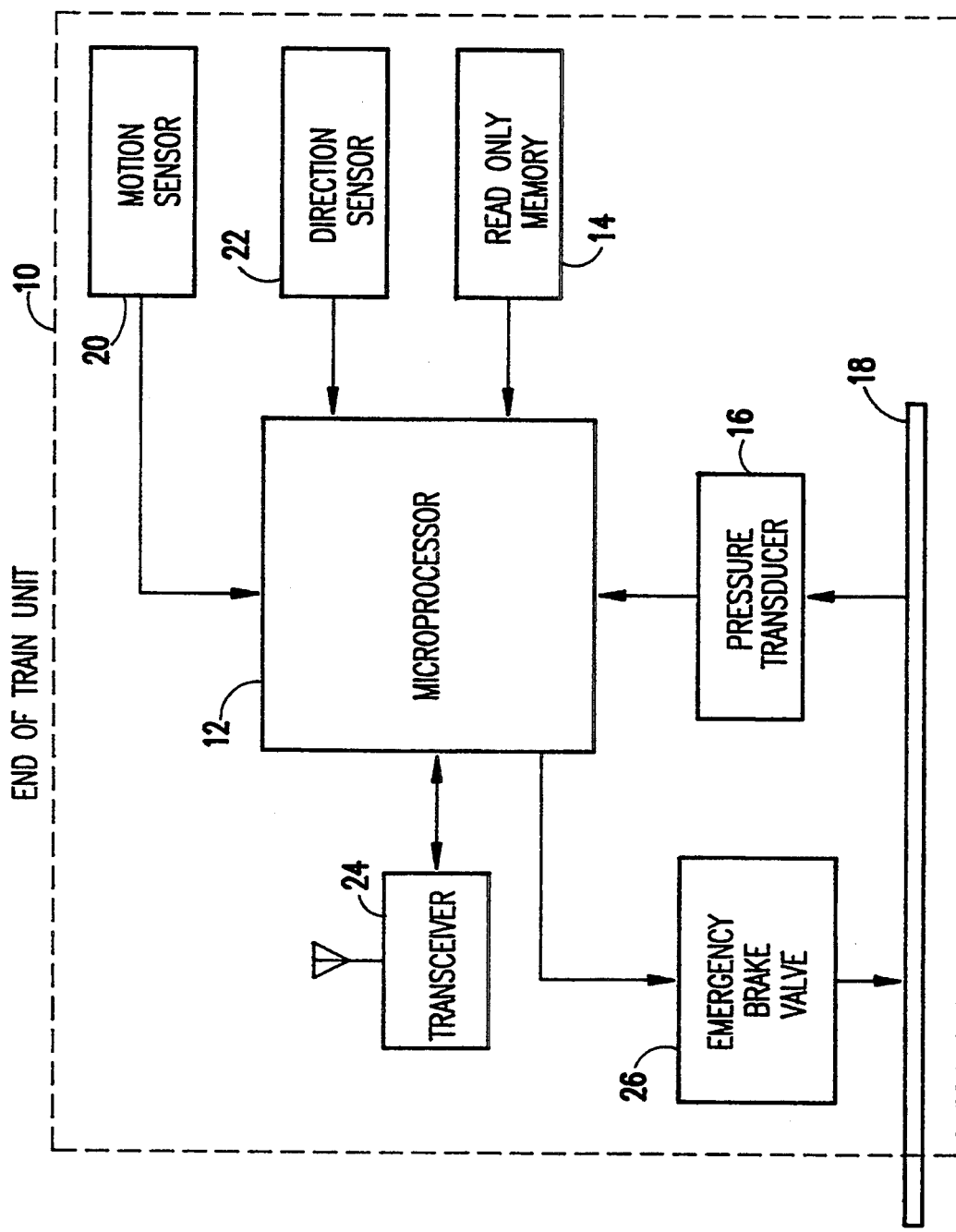
FIG. 1 is a block diagram of a two-way EOT unit of the type currently in use.

Referring now to the drawings, and more particularly to FIG. 1, there is shown in block diagram form the principal components of an EOT unit 10 of the type in general use in the railroad industry today. The EOT unit 10 is controlled by a microprocessor 12 having read only memory (ROM) 14 in which the control program for the microprocessor is stored. The microprocessor 12 receives an input from pressure transducer 16 connected to the air brake pipe 18 of the train. Inputs are also received by the microprocessor 12 from, for example, a motion sensor 20 and, optionally, a direction sensor 22. These inputs are processed by the microprocessor according to the control program stored in ROM 14, and the resulting data is formatted for transmission via a radio transceiver 24 to the HOT unit (shown in FIG. 2) for display in the locomotive cab.

The original EOT telemetry systems were one-way systems; that is, data was periodically transmitted from the EOT unit to the HOT unit in the locomotive where the information was displayed. More recently, two-way systems have been introduced wherein transmissions are made by the HOT unit to the EOT unit. In one specific application, the EOT unit controls an air valve in the brake line which can be controlled by a transmission from the HOT unit. In a one-way system, emergency application of the brakes starts at the locomotive and progresses along the brake pipe to the end of the train. This process can take significant time in a long train, and if there is a restriction in the brake pipe, the brakes beyond the restriction may not be actuated. With a two-way system, emergency braking can be initiated at the end of the train independently of the initiation of emergency braking at the head of the train, and the process or brake application can be considerably shortened. As will be appreciated by those skilled in the art, in order for a HOT unit to communicate emergency commands to an associated EOT unit, it is desirable for the HOT unit to be "armed"; that is, authorized by railroad personnel. This is desirable to prevent one HOT unit from erroneously or maliciously actuating the emergency brakes in another train. To this end the HOT unit includes a nonvolatile memory in which a unique code identifying an EOT unit can be stored. The HOT unit also has a row of thumb wheel switches, as will be described in more detail hereinafter. In the two-way systems where the HOT unit can transmit to the EOT unit, such transmissions are received by the transceiver 24 and input to the microprocessor 12. If an emergency brake command is received by the EOT, the microprocessor 12 causes the emergency brake valve 26 to open thereby venting air from the brake pipe 18 to atmosphere.

Figure 2:
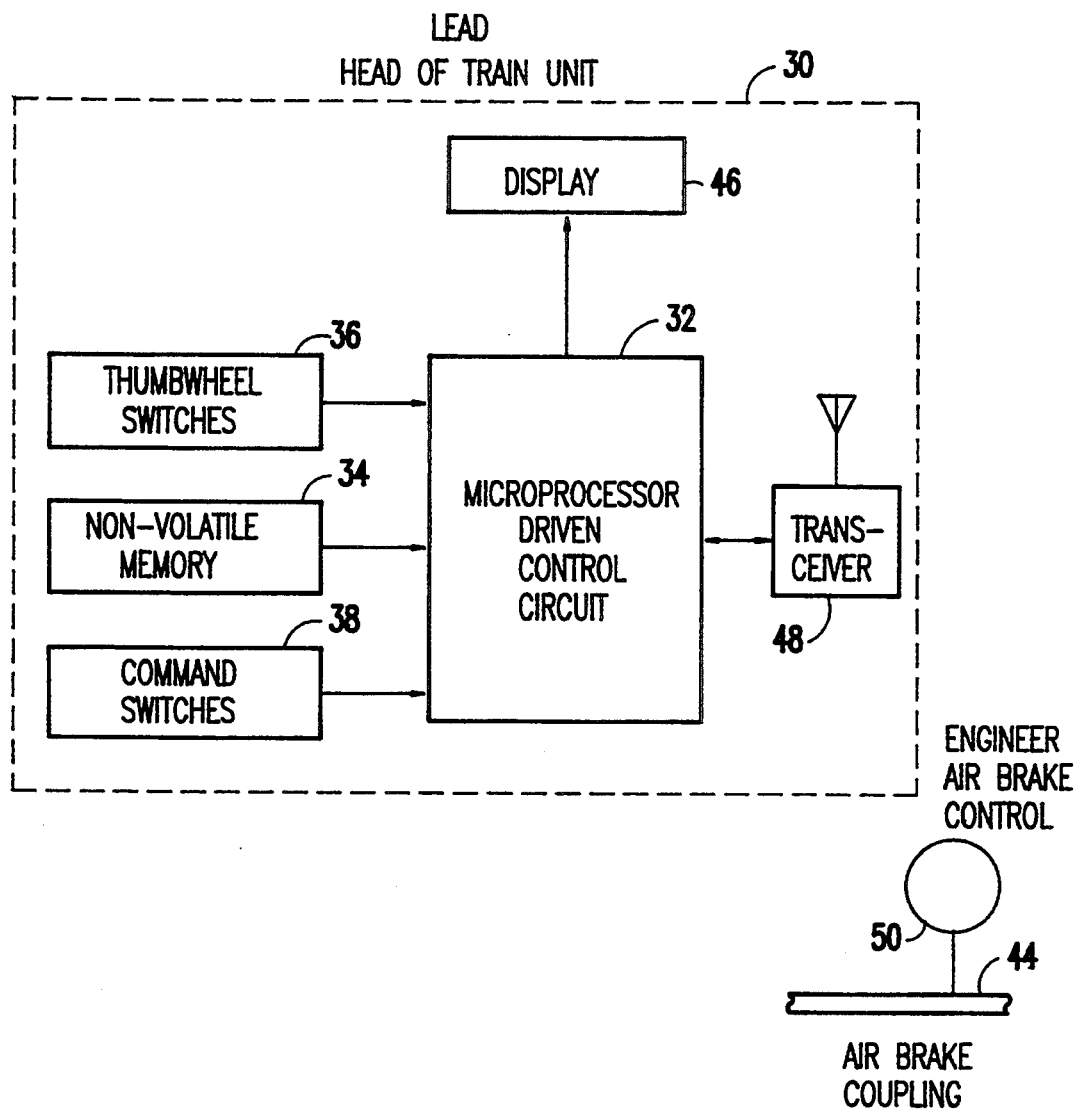
FIG. 2 is a block diagram of the a HOT unit of the type currently in use.

FIG. 2 shows in block diagram form the principal components of an HOT unit 30 as would be used in a lead locomotive. The HOT unit 30 includes microprocessor control circuit 32, a nonvolatile memory 34 which stores the control program for the microprocessor control circuit, and a series of thumb wheel switches 36 through which an operator stationed at the HOT unit can manually enter the unique code number of the EOT unit 10. In addition to inputs from the thumb wheel switches and nonvolatile memory, the microprocessor control circuit 32 also has a command switch input 38, and provides outputs to a display 46 and transceiver 48. The display 46 displays EOT pressure data received by the transceiver 48. A locomotive engineer controls air brakes via the normal locomotive air brake controls, indicated schematically at 50, and the air brake pipe 44 which extends the length of the train. It will be understood that the brake pipe 44 and the brake pipe 18 shown in FIG. 1 are the same.

Figure 3:
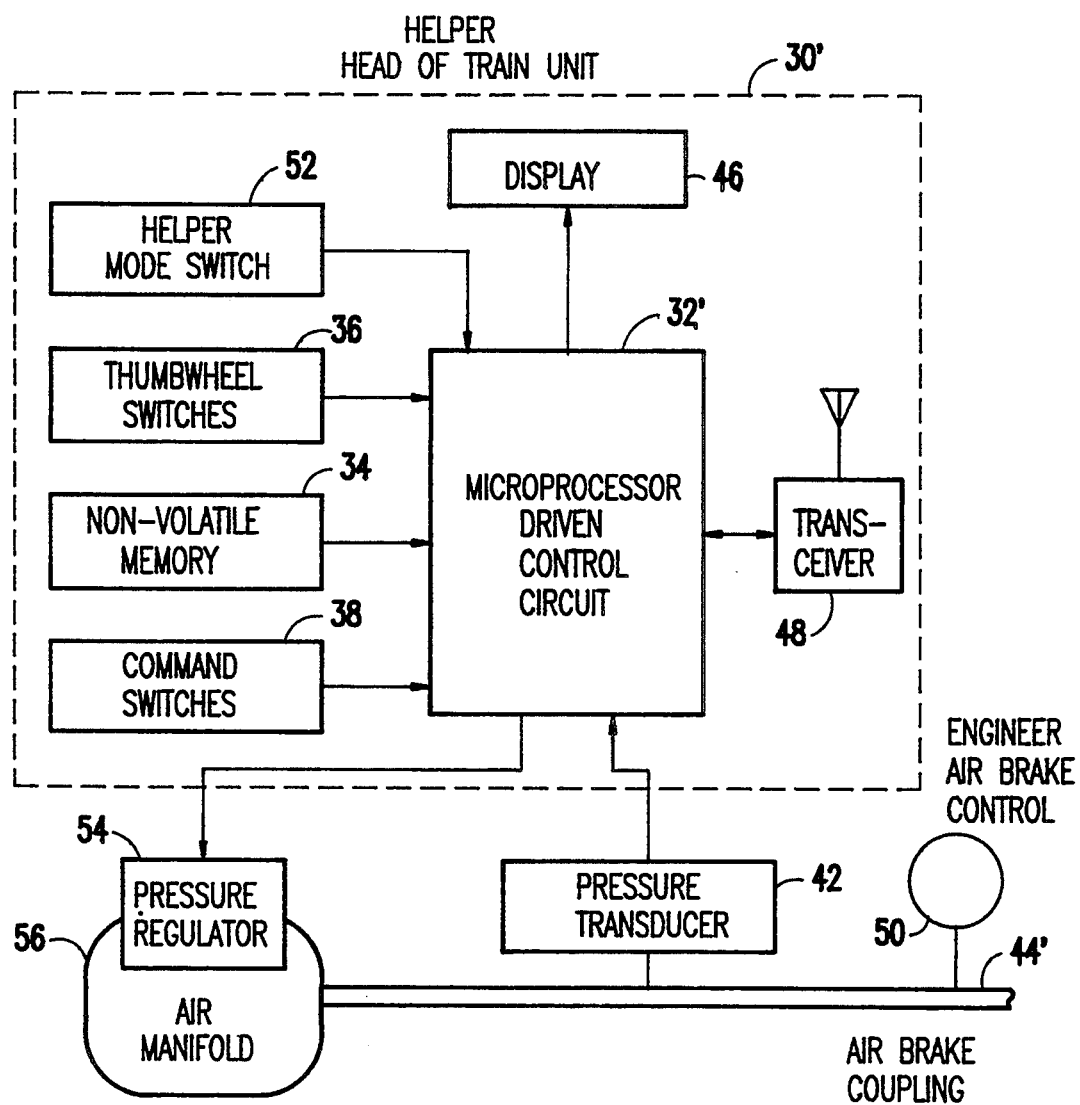
FIG. 3 is a block diagram of the helper HOT unit showing the addition of a helper mode selector switch and air pressure control.

FIG. 3 shows in block diagram form the components of the HOT unit 30' as is used in a helper locomotive according to the present invention. In FIG. 3, the same or identical components as in the HOT unit 30 shown in FIG. 2 are identified by the same reference numerals as used in FIG. 2. Similar but not identical components are indicated by means of a primed reference numeral. In addtion to the other inputs, the microprocessor control circuit 32' receives an input from a pressure transducer 42, which is coupled to the brake pipe 44' of the helper locomotive. The HOT unit 30' for a helper locomotive is basically identical to that of the lead locomotive except that it includes a helper mode switch 52, which is used to select the helper mode, and a pressure regulator 54 connected to the pressure maintaining air manifold 56, which operates to hold a target pressure received from the EOT unit by opening or closing valves that connect the brake pipe 44' to supply pressure (to the locomotive main reservoir, not shown) or venting pressure to atmosphere. Thus, the pressure transducer 42, microprocessor control circuit 32', pressure regulator 54 and air manifold 56 connected to the brake pipe 44' constitute a feedback circuit. Also, since the HOT unit is in the helper locomotive, the brake pipe 44' and the brake pipe 18 shown in FIG. 1 are not the same.

When the helper locomotive couples with the last car in the train, the engineman in the helper locomotive first dials in the EOT ID using thumbwheel switches 36. This allows the HOT unit in the helper train to receive the transmissions from the EOT unit mounted on the last car. The engineman then arms the HOT unit following standard Associateon of American Railroads (AAR) procedures and selects the helper mode by actuating switch 52. This causes the microprocessor control circuit 32 to regulate the pressure in brake pipe 44', via the pressure regulator 54 and pressure maintaining air manifold 56 to match the brake pipe pressure data transmitted by the EOT unit, thereby "mirroring" the pressure sensed by the EOT unit. In this mode, the brakes of the helper locomotive are controlled by the engineman in the lead locomotive. In addition, if the pressure transducer 42 detects a sudden drop in pressure of brake pipe 44′, as when the helper engineer moves the brake handle to "emergency" venting pressure to atmosphere, the microprocessor control unit 32′ will transmit this information via the transceiver 48 to the EOT unit, commanding the EOT unit to initiate an emergency brake application on the train.

It will be observed that the operation of the system is essentially fully automatic, avoiding the necessity for someone to physically connect or disconnect the brake hose of the train and the helper locomotive(s). All that is necessary is that the helper locomotive couple to the last car of the train, the EOT unit ID be dialed in at the helper locomotive HOT unit, and a helper locomotive mode be selected on the HOT unit. From that point on, the brakes of the helper locomotive are coupled by a radio frequency (RF) link, as opposed to a pneumatic link, to the brakes of the train, and when a pressure drop is sensed and that data transmitted by the EOT unit, the pressure in the helper locomotive brake pipe is reduced to match that at the end of the train, causing a similar application of brakes in the helper locomotive. To decouple, the engineman in the helper locomotive disables the helper locomotive mode in his HOT unit, so that the HOT unit will no longer control the brake pipe pressure to match that transmitted by the EOT unit, and then performs an on-the-fly decoupling.

The invention offers significant advantages to the railroad industry. These include safety enhancement for railroad personnel, since no one is exposed to the physical risks associated with the manual physical coupling and uncoupling of brake hoses. In addition, there are cost savings in the form of coupling/uncoupling time reduction and fuel savings since the train does not have to stop to uncouple from the helper locomotive and then start again.

In addition, the invention allows for a flexibility of operation. The helper engineer applies power as required and also has the ability to place the entire train in emergency by moving the brake handle to "emergency" or just opening to atmosphere an emergency valve. Opening the air line at any point in the train causes an emergency brake application. Thus, if while EOT pressure transmissions are in the normal operating range, the pressure transducer in the HOT of the helper locomotive senses a sudden drop in pressure at the helper locomotive's brake pipe, the helper locomotive HOT unit automatically transmits to the EOT a command to execute an emergency.

While the invention has been described in terms of a single preferred embodiment, those skilled in the art will recognize that the invention can be practiced with modification within the spirit and scope the appended claims.

Having thus described our invention, what we claim as new and desire to secure by Letters Patent is as follows:

1. A brake control system for railroad locomotives for controlling the brakes of a helper locomotive from a lead locomotive in a train wherein the helper locomotive is coupled to the train while a brake pipe of the train is not physically connected to a brake pipe of the helper locomotive, said brake control system comprising:

first pressure sensing means mounted on a car of the train and coupled to the brake pipe of the train for monitoring brake pipe pressure of the train and generating a first signal proportional to the monitored train brake pipe pressure;

telemetry means responsive to said first signal for transmitting a data signal representative of said first signal;

receiving means mounted in the helper locomotive tuned to receive the transmitted data signal;

second pressure sensing means connected to the brake pipe of said helper locomotive for monitoring brake pipe pressure of the helper locomotive and generating a second signal proportional to the monitored helper locomotive brake pipe pressure;

control means connected to said receiving means and responsive to said second signal for determining a difference between the monitored brake pipe pressures of the train and the helper locomotive and generating a control signal; and pressure regulator means responsive to said control signal and connected to the brake pipe of said helper locomotive for maintaining the brake pipe pressure of the helper locomotive equal to the train brake pipe pressure.

2. The brake control system recited in claim 1 wherein said telemetry means includes a receiver for receiving command signals, said system further comprising:

transmitter means mounted in said lead locomotive for transmitting said command signals; and valve means connected to the brake pipe of the train and responsive to said command signals received by said receiver for venting brake pipe pressure to atmosphere.

3. The brake control system recited in claim 1 wherein said first pressure sensing means and said telemetry means comprise and End of Train (EOT) unit mounted on said car and said receiving means is a Head of Train (HOT) unit mounted in said helper locomotive.

4. The brake control system recited in claim 3 wherein said EOT unit includes a receiver for receiving command signals, said system further comprising:

a second HOT unit including transmitter means mounted in said lead locomotive for transmitting said command signals; and valve means connected to the brake pipe of the train and responsive to said command signals received by said EOT unit receiver for venting brake pipe pressure to atmosphere.

5. The brake control system recited in claim 4 wherein said HOT unit mounted in said helper locomotive includes second transmitter means for transmitting command signals, said receiver in said EOT unit also responding to the command signals transmitted by said second transmitter means to control said valve means.

6. A brake control system for railroad locomotives for controlling the brakes of a helper locomotive from a lead locomotive in a train wherein the helper locomotive is coupled to the train, comprising:

an End of Train (EOT) unit mounted on a car of the train and coupled to a brake pipe of the train, said EOT unit being coupled to the brake pipe of the train for monitoring brake pipe pressure and including a transmitter for transmitting brake pipe pressure data indicative of the monitored brake pipe pressure;

a Head of Train (HOT) unit mounted in the helper locomotive and including a receiver tuned to receive the transmitted brake pipe pressure data from said EOT unit; and a pressure regulator, a pressure maintaining air manifold and a pressure transducer connected to a brake pipe of said helper locomotive and controlled by said HOT unit to match the brake pipe pressure sensed by said pressure transducer to the brake pipe pressure data transmitted by the EOT unit, thereby "mirroring" the pressure sensed by the EOT unit.

7. The brake control system for railroad locomotives recited in claim 6 wherein said EOT unit further includes a receiver for receiving transmissions from said HOT unit and said HOT unit includes a transmitter for transmitting an emergency signal to said EOT unit, said HOT unit responding to a signal generated by said pressure transducer when pressure in the brake pipe of the helper locomotive is vented to atmosphere to transmit said emergency signal to said EOT unit, and said EOT unit responds to said emergency signal by initiating an emergency condition in the train.

8. A method of brake control for railroad locomotives for controlling the brakes of a helper locomotive from a lead locomotive in a train wherein the helper locomotive is coupled to the train, comprising the steps of:

mounting an End of Train (EOT) unit on a car of the train and coupling the EOT unit to a brake pipe of the train, said EOT unit monitoring brake pipe pressure and including a transmitter for transmitting brake pipe pressure data indicative of the monitored brake pipe pressure:

mounting a Head of Train (HOT) unit in the helper locomotive and connecting the HOT unit to be responsive to monitored brake pipe pressure of the helper locomotive, said HOT unit including a receiver tuned to receive transmitted brake pipe pressure data from the EOT unit; and enabling the HOT unit to respond to transmitted brake pipe pressure data from the EOT unit by controlling a pressure regulator connected to a pressure maintaining air manifold of the helper locomotive to match the monitored brake pipe pressure of the helper locomotive to the brake pipe pressure data transmitted by the EOT unit, thereby "mirroring" the pressure sensed by the EOT unit.

9. The method of brake control recited in claim 8 further comprising the step of disabling the HOT unit mounted in the helper locomotive as part of a decoupling procedure when the helper locomotive is decoupled from the train.

* * * * *